United States Patent
Yang et al.

(10) Patent No.: US 12,488,911 B2
(45) Date of Patent: Dec. 2, 2025

(54) CONNECTION STRUCTURE OF THIN FILM ELECTRODE AND HOUSING

(71) Applicants: HANGZHOU WEIMING XINKE TECHNOLOGY CO., LTD, Zhejiang (CN); ADVANCED INSTITUTE OF INFORMATION TECHNOLOGY (AIIT), PEKING UNIVERSITY, Zhejiang (CN)

(72) Inventors: Qian Yang, Zhejiang (CN); Liang Li, Zhejiang (CN); Meng Gao, Zhejiang (CN); Le Ye, Zhejiang (CN)

(73) Assignees: HANGZHOU WEIMING XINKE TECHNOLOGY., LTD, Zhejiang (CN); ADVANCED INSTITUTE OF INFORMATION TECHNOLOGY (AIIT), PEKING UNIVERISTY, Zhejiang (CN)

( * ) Notice: Subject to any disclaimer, the term of this patent is extended or adjusted under 35 U.S.C. 154(b) by 365 days.

(21) Appl. No.: 18/021,303

(22) PCT Filed: Jun. 11, 2021

(86) PCT No.: PCT/CN2021/099639
§ 371 (c)(1),
(2) Date: Feb. 14, 2023

(87) PCT Pub. No.: WO2022/068260
PCT Pub. Date: Apr. 7, 2022

(65) Prior Publication Data
US 2023/0298780 A1  Sep. 21, 2023

(30) Foreign Application Priority Data
Sep. 30, 2020  (CN) .......................... 202011054049.7

(51) Int. Cl.
*H01B 5/14*  (2006.01)

(52) U.S. Cl.
CPC ...................................... *H01B 5/14* (2013.01)

(58) Field of Classification Search
CPC . H01B 5/14; A61B 18/14; A61B 2018/00065; A61B 2018/00178; A61B 2018/1405; H05K 5/0247
See application file for complete search history.

(56) References Cited

U.S. PATENT DOCUMENTS

| 6,555,748 | B1 * | 4/2003 | Gul | ...................... | H05K 5/0247 73/431 |
| 2014/0100633 | A1 * | 4/2014 | Mann | ................... | A61N 1/0551 607/116 |

(Continued)

FOREIGN PATENT DOCUMENTS

| CN | 109069033 A |   | 12/2018 |   |
| CN | 110755699 A | * | 2/2020 | ............. A61M 1/74 |
| CN | 111918506 A | * | 11/2020 | ............... H01B 5/14 |

*Primary Examiner* — Catherine M Voorhees
(74) *Attorney, Agent, or Firm* — MUNCY, GEISSLER, OLDS & LOWE, P.C.

(57) ABSTRACT

A connection structure of a thin film electrode and a housing includes at least one thin film electrode unit and a housing; the electrode unit includes a porous thin film, a first electrode and a second electrode attached to two sides of the film; a part of the film and a part of the first electrode form a first electrical connection unit; a part of the film and a part of the second electrode form a second electrical connection unit; at least one installation groove is provided on the inner wall surface of the housing; the electrode unit is provided in the installation groove; at least one communication unit communicated with the installation groove is further provided on the outer wall surface of the housing; the first electrical connection unit and the second electrical connection unit are respectively communicated with an external circuit of the housing through the communication unit.

9 Claims, 8 Drawing Sheets

(56) References Cited

U.S. PATENT DOCUMENTS

2017/0219443 A1* 8/2017 Davis ................... G01L 1/146
2019/0380220 A1* 12/2019 Matsuda ............... H01R 13/41

* cited by examiner

CONNECTION STRUCTURE OF THIN FILM ELECTRODE AND HOUSING

CROSS REFERENCE TO RELATED APPLICATIONS

This application is a national application of PCT/CN2021/099639, filed on Jun. 11, 2021. The contents of PCT/CN2021/099639 are all hereby incorporated by reference.

TECHNICAL FIELD

The present disclosure belongs to the technical field of electrode devices; specifically, the present disclosure relates to a connected structure of a thin film electrode and a housing.

BACKGROUND

In medical devices, especially for implantable medical devices, since the safety of medical devices and the stability of long-term implantation have to be taken into consideration, an electrical connection of electrodes must have good reliability and mechanical stability. In addition, due to the high degree of integration and miniaturization of the implantable medical devices, the electrodes not only have a small size, but also require a high degree of integration. Furthermore, the lead wire bonding method is mostly used to electrically connect the thin film composite electrode, of which the thickness is in the micron level, with an external structure. However, considering that the thin film composite electrode is thin and that the thin lead wires used lack firmness, a spiral wire structure and multiple times of spot welding are required to further increase the reliability and mechanical stability of the electrical connection between the thin film composite electrode and the external structure. Secondly, the addition of the spiral wire structure and the increase of the thickness at the lead wire bonding position result in the increase of an overall thickness of the thin film composite electrode, which increases a minimum distance between the thin film composite electrodes. This is not advantageous for the miniaturization and integration of the thin film composite electrodes, and may also lead to adverse results such as poor reproducibility between batches, difficulty in batch processing, etc.

SUMMARY

The present disclosure provides a connected structure of a thin film electrode and a housing, and the connected structure includes:
- at least one thin film electrode unit including a porous thin film, a first electrode and a second electrode, in which the first electrode and the second electrode are fitted on two sides of the porous thin film, a part of the porous thin film and a part of the first electrode form a first electrical connection unit, and a part of the porous thin film and a part of the second electrode form a second electrical connection unit;
- a housing, in which an inner wall face of the housing is provided with at least one installation groove, and the thin film electrode unit is arranged in the installation groove; an outer wall face of the housing is further provided with at least one communication unit for communicating with the installation groove, and the first electrical connection unit and the second electrical connection unit respectively communicate with an external circuit of the housing through the communication unit.

BRIEF DESCRIPTION OF THE DRAWINGS

Upon reading the detailed description of the preferred embodiments below, various other advantages and benefits will become clear to those skilled in the art. The accompanying drawings are only used for the purpose of illustrating preferred embodiments, and should not be considered as a limitation to the present disclosure. Moreover, throughout the drawings, the same reference signs are used to denote the same components, in which.

LIST OF REFERENCE SIGNS

Figure 1:
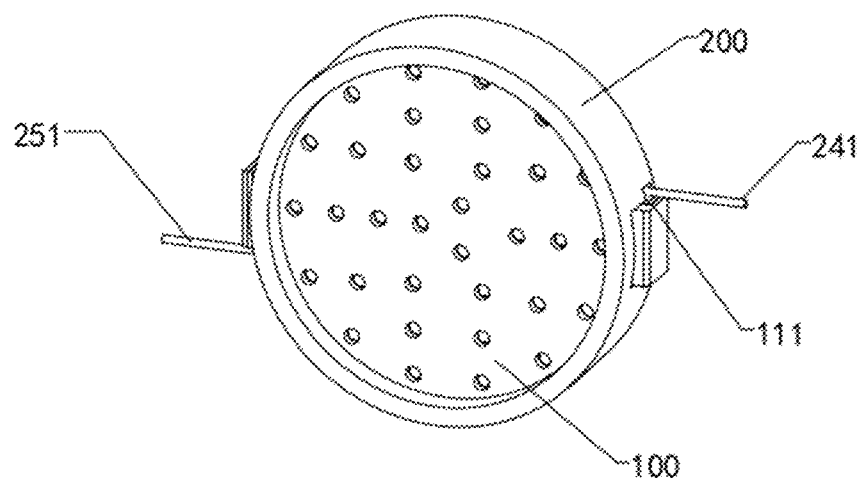
FIG. 1 is a schematic view of a connected structure of a thin film electrode and a housing according to a first embodiment of the present disclosure.

100: thin film electrode unit;
10: porous thin film; 11: first electrode; 111: first electrical connection unit; 12: second electrode; 121: second electrical connection unit; 13: first protruding end; 14: second protruding end;
200: housing; 210: installation groove; 220: first slot; 230: second slot; 240: first pad; 250: second pad; 261: first through hole; 262: second through hole; 270: first loading slot; 271: first exhaust hole; 280: second loading slot; 201: first housing, 202: second housing, 241: first conductive lead, 251: second conductive lead, 281: second exhaust hole, 290: installation hole, 291: conductive layer.

DETAILED DESCRIPTION

Hereinafter, exemplary embodiments of the present disclosure will be described in greater detail with reference to the accompanying drawings. Although the exemplary embodiments of the present disclosure are shown in the drawings, it should be understood that the present disclosure may be implemented in various forms and should not be limited by the embodiments set forth herein. On the contrary, these embodiments are provided to enable a more thorough understanding of the present disclosure and to fully convey the scope of the present disclosure to those skilled in the art.

It should be understood that the terms used herein are only for the purpose of describing specific exemplary embodiments, and are not intended to be limitative. Unless clearly indicated otherwise in the context, singular forms "a", "an", and "said" as used herein may also mean that plural forms are included. Terms "include", "comprise", "contain" and "have" are inclusive, and therefore indicate the existence of the stated features, steps, operations, elements and/or components, but do not exclude the existence or addition of one or more other features, steps, operations, elements, components, and/or combinations thereof. The method steps, processes, and operations described herein should not be interpreted as requiring them to be executed in the specific order described or illustrated, unless the order of execution is clearly indicated. It should also be understood that additional or alternative steps may be used.

Although terms "first", "second", "third" and the like may be used herein to describe multiple elements, components, regions, layers and/or sections, these elements, components, regions, layers and/or sections should not be limited by these terms. These terms may only be used to distinguish one element, component, region, layer or section from another region, layer or section. Unless clearly indicated in the context, terms such as "first", "second" and other numerical terms do not imply an order or sequence when they are used herein. Therefore, the first element, component, region, layer or section discussed below may be referred to as a second element, component, region, layer or section without departing from the teachings of the exemplary embodiments.

For ease of description, spatial relative terms may be used herein to describe the relationship of one element or feature relative to another element or feature as shown in the drawings. These relative terms are, for example, "inner", "outer", "inside", "outside", "below", "under", "above", "over", etc. These spatial relative terms are intended to include different orientations of the device in use or in operation in addition to the orientation depicted in the drawings. For example, if the device in the figure is turned over, then elements described as "below other elements or features" or "under other elements or features" will be oriented as "above the other elements or features" or "over the other elements or features". Thus, the exemplary term "below" may include orientations of both above and below. The device can be otherwise oriented (rotated by 90 degrees or in other directions), and the spatial relationship descriptors used herein will be explained accordingly.

First Embodiment

As shown in FIGS. 1 to 5, a connected structure of a thin film electrode and a housing of the present embodiment includes a thin film electrode unit 100 and a housing 200. The thin film electrode unit 100 includes a porous thin film 10, a first electrode 11 and a second electrode 12; the first electrode 11 and the second electrode 12 are fitted on two sides of the porous thin film 10. The porous thin film 10 in the present embodiment is a flexible porous thin film. The first electrode 11 only covers a central circular part and a first protruding end 13 of the porous thin film 10, and a second protruding end 14 is not covered by the first electrode 11. The second electrode 12 only covers the central circular part and the second protruding end 14 of the porous thin film 10, and the first protruding end 13 is not covered by the second electrode 12, so that the first protruding end 13 forms a first electrical connection unit 111 with the first electrode 11 covering a surface of the first protruding end 13, the second protruding end 14 forms a second electrical connection unit 121 with the second electrode 12 covering a surface of the second protruding end 14, and the first electrical connection unit 111 and the second electrical connection unit 121 are arranged spaced apart in a circumferential direction of the porous thin film 10, thus preventing the first electrical connection unit 111 and the second electrical connection unit 121 from being short-circuited during the process of connecting the first electrical connection unit 111 and the second electrical connection unit 121 with the housing 200. The first electrical connection unit 111 and the second electrical connection unit 121 may have any included angle therebetween. In other embodiments of the present application, the first electrical connection unit 111 and the second electrical connection unit 121 may also be arranged such that they are overlapped up and down or they cross each other, but the first electrical connection unit 111 and the second electrical connection unit 121 should be prevented from being short-circuited during the process of connecting the first electrical connection unit 111 and the second electrical connection unit 121 with the housing 200.

The first electrode 11 and the second electrode 12 in the present embodiment can be respectively modified on two sides of the porous thin film 10 by means of magnetron sputtering, ion sputtering, electroless deposition, atomic layer deposition, chemical vapor deposition, plasma enhanced chemical vapor deposition and other methods. The first electrode 11 and the second electrode 12 may be made of metallic materials such as platinum, gold, platinum-iridium alloy and titanium, or may be made of one or more of conductive non-metallic materials such as graphite and conductive polymer. The porous thin film 10 can be prepared by track etching and other methods, and biocompatible materials such as polycarbonate, polyurethane and polymethyl methacrylate can be chosen for the porous thin film 10.

Figure 2:
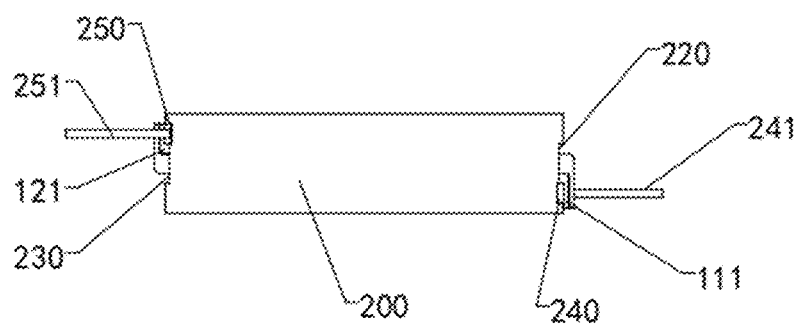
FIG. 2 is a schematic view of the connected structure of the thin film electrode and the housing in FIG. 1 from another perspective.
Figure 3:
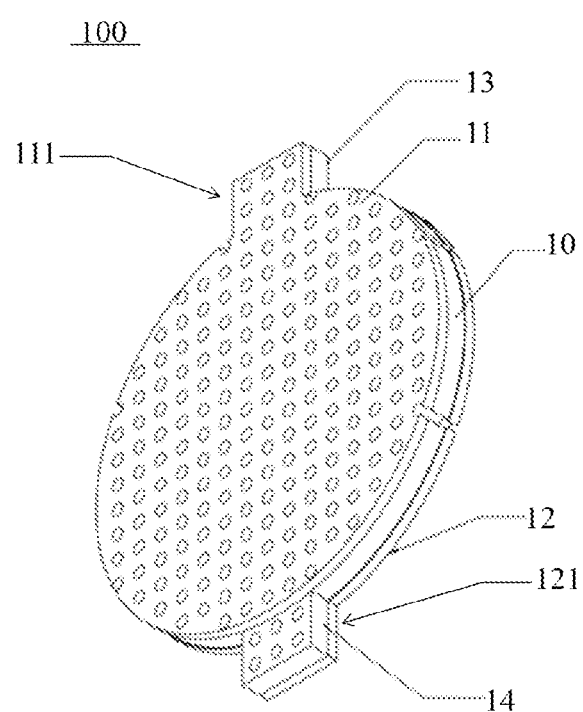
FIG. 3 is a schematic structural view of a thin film electrode unit in FIG. 1.
Figure 4:
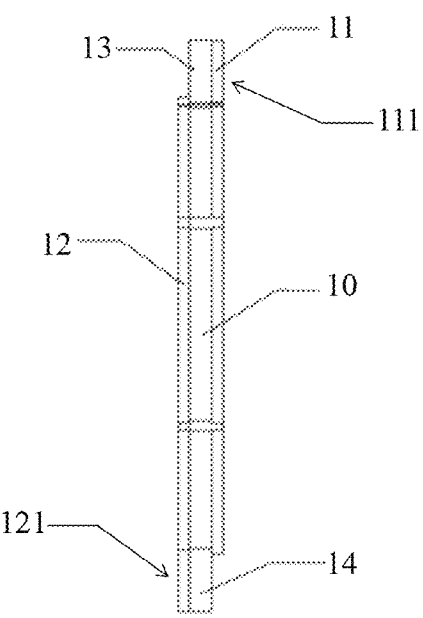
FIG. 4 is a schematic structural view of the thin film electrode unit in FIG. 3 from another perspective.
Figure 5:
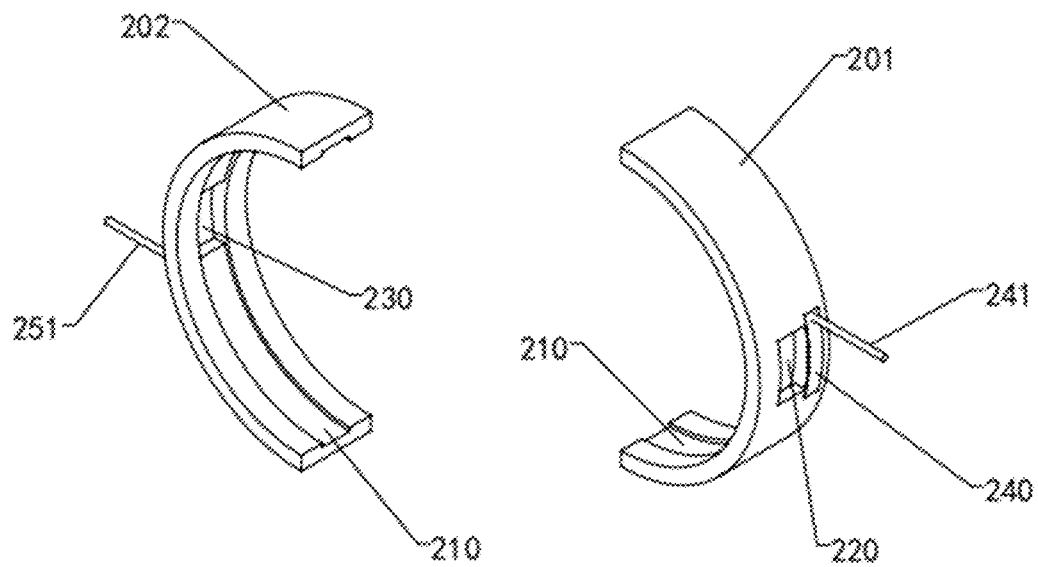
FIG. 5 shows the structural schematic diagrams of the first housing and the second housing disassembled from the housing in FIG. 1.
Figure 6:
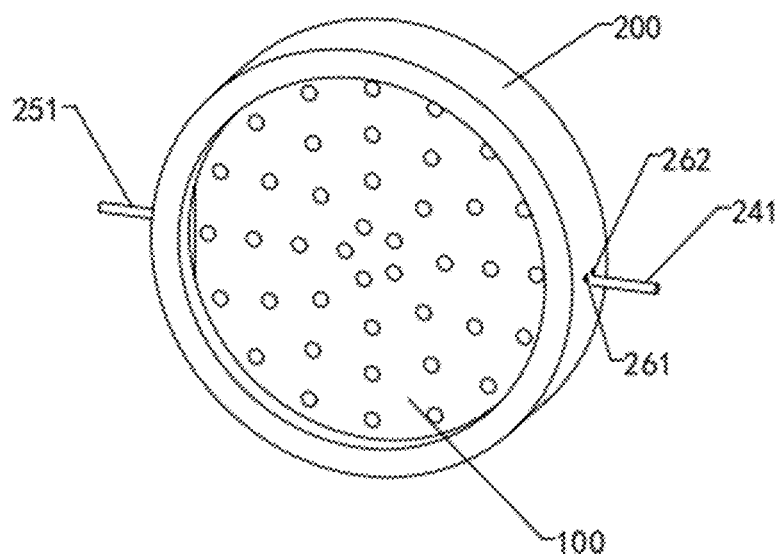
FIG. 6 is a schematic view of the connected structure of the thin film electrode and the housing according to a second embodiment of the present disclosure.
Figure 7:
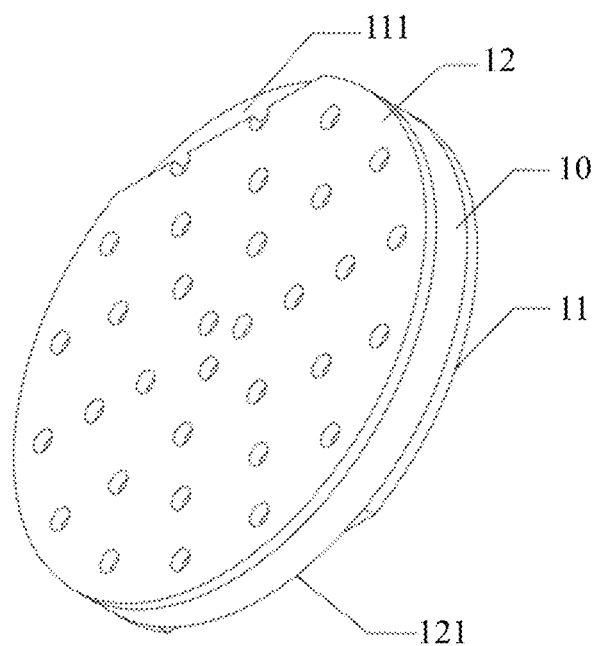
FIG. 7 is a schematic structural view of a thin film electrode unit in FIG. 6.
Figure 8:
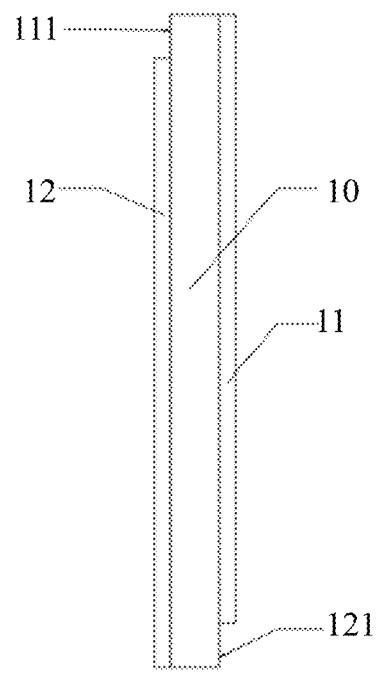
FIG. 8 is a schematic structural view of the thin film electrode unit in FIG. 7 from another perspective.
Figure 9:
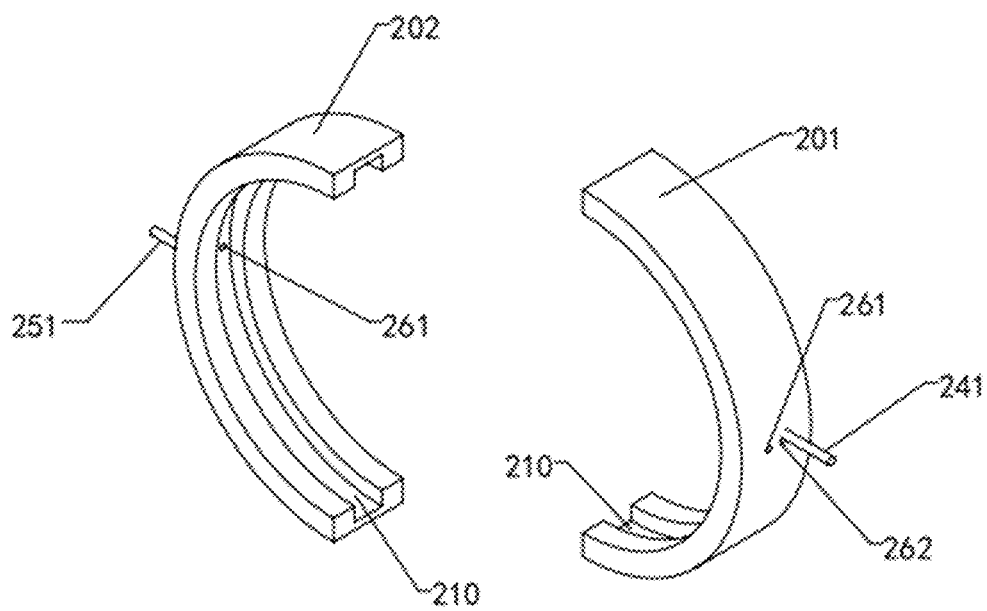
FIG. 9 is a schematic structural view of the housing in FIG. 6.

As shown in FIGS. 1, 2 and 5, an inner wall face of the housing 200 of the present embodiment is provided with an installation groove 210, and the thin film electrode unit 100 is arranged in the installation groove 210. An outer wall face of the housing 200 is further provided with a first slot 220 and a second slot 230 which communicate with the installation groove 210. The first electrical connection unit 111 is arranged opposite to the first slot 220 and passes through the first slot 220. The second electrical connection unit 121 is arranged opposite to the second slot 230 and passes through the second slot 230. An included angle between the first slot 220 and the second slot 230 is consistent with the included angle between the first electrical connection unit 111 and the second electrical connection unit 121. The outer wall face of the housing 200 is further provided with a first pad 240 and a second pad 250. The first pad 240 is arranged in correspondence with the first slot 220, and the second pad 250 is arranged in correspondence with the second slot 230. The first slot 220 and the first pad 240 may be closely connected, so that the first electrical connection unit 111 is directly connected with the first pad 240 after protruding from the first slot 220. The first slot 220 and the first pad 240 may also be separated by a certain distance, and the first electrical connection unit 111 protruding from the first slot 220 is bent and then connected with the first pad 240. The connection relationship between the second slot 230 and the second pad 250 is consistent with that between the first slot 220 and the first pad 240. The first pad 240 and the second pad 250 may be of any shape such as rectangle and circle. The outer wall face of the housing 200 can be arranged with a plurality of conductive lead wires (not shown) as required, which are electrically connected with the first pad 240 and the second pad 250 respectively, so as to supply power to the first electrical connection unit 111 and the second electrical connection unit 121.

The housing 200 of the present embodiment includes a first housing and a second housing (not shown) which are detachably connected to each other. The first housing and the second housing are arranged symmetrically with respect to an axial direction of the housing 200. The first housing is provided with the first slot 220 and the first pad 240, and the second housing is provided with the second slot 230 and the second pad 250. In other embodiments of the present application, the first slot 220, the first pad 240, the second slot 230 and the second pad 250 may also be arranged on the first housing or the second housing at the same time. The housing 200 of the present embodiment is arranged as a cylindrical structure, which corresponds to the shape of the porous thin film 10, and its constituent materials may be a non-conductive biocompatible material with a certain hardness, such as ceramic, glass and polymer. The pads and required lead wires may be made of biocompatible metallic materials, such as platinum, gold, platinum-iridium alloy and titanium. The installation groove 210, the first slot 220 and the second slot 230 are prepared on the housing 200 by means of machining, injection molding, etching, 3D printing and other methods. The first pad 240, the second pad 250 and the plurality of conductive lead wires connected with the first pad 240 and the second pad 250 respectively are prepared on the outer wall face of the housing by means of sputtering, electroplating, atomic layer deposition, electroless deposition, chemical vapor deposition, etc.

When assembling the thin film electrode of the present embodiment with the housing 200, the following steps are included:

1. fixing part of the structure of the thin film electrode unit 100 in the installation groove 210 of the first housing, and passing the first electrical connection unit 111 through the first slot 220;
2. connecting the second housing with the first housing so that the other part of the structure of the thin film electrode unit 100 is fixed in the installation groove 210 of the second housing, and passing the second electrical connection unit 121 through the second slot 230;
3. welding the first electrical connection unit 111 and the second electrical connection unit 121 with the first pad 240 and the second pad 250 respectively through spot welding by using technologies such as thermoacoustic welding, ultrasonic welding and vacuum reflow soldering;
4. welding the first housing and the second housing together by using technologies such as laser welding, thermoacoustic welding, ultrasonic welding, vacuum reflow soldering, and hot pressure welding;
5. selecting biocompatible insulating and water-resistant gel such as silica gel to fill and cover the outside of the first slot 220, the second slot 230, the first electrical connection unit 111, the second electrical connection unit 121 and the conductive lead wires.

The connected structure in the present embodiment may also be provided with a plurality of installation grooves 210 on the housing 200, and each of the installation grooves 210 is correspondingly provided with slots and pads; at the same time, a plurality of thin film electrode units 100 are arranged in the plurality of installation grooves 210 in such a way that the plurality of thin film electrode units 100 are spaced apart, and a spacing between the thin film electrode units 100 can be adjusted at will according to the requirements.

In the connected structure of the thin film electrode and the housing 200 according to the present application, the thin film electrode unit 100 is arranged in the installation groove 210 inside the housing 200, and the first electrical connection unit 111 and the second electrical connection unit 121 respectively communicate with the circuit outside the housing 200 through the first slot 220 and the second slot 230 on the housing 200, so that an effective electrical connection between the thin film electrode and the circuit outside the housing 200 is realized; moreover, it is not easy for the thin film electrode to loosen, and a reliable connection between the thin film electrode and the housing 200 is ensured. At the same time, a plurality of installation grooves 210 and a plurality of thin film electrode units 100 can be provided in the housing 200 at the same time. By arranging the thin film electrode units 100 in different installation grooves 210 respectively, a spacing between the thin film electrode units 100 can be adjusted at will, thus avoiding the problems of size limitation caused by external lead wire welding, batch processing difficulty and poor consistency between batches. At the same time, the biocompatible materials are chosen for the preparation of the thin film electrode units 100 and the housing 200, and the connected structure can be widely used in electrical extraction of sensor electrodes and electrophoresis devices, or can also be used as an overall electrode unit for application in medical implantable sensors.

Second Embodiment

As shown in FIGS. 6 to 9, the porous thin film 10 of the present embodiment is a rigid porous thin film, and the porous thin film 10 is of a circular structure without protruding ends. The first electrode 11 is modified on one side of the porous thin film 10 by means of sputtering, atomic layer deposition, chemical vapor deposition, electroless deposition, etc., and in the modification process, a part on the same side for forming the second electrical connection unit 121 is covered by a mask to form a selective modification. In the same way, the second electrode 12 is selectively modified on the other side of the porous thin film 10, and in the modification process, a part on the same side for forming the first electrical connection unit 111 is covered by a mask. The first electrical connection unit 111 and the second electrical connection unit 121 are spaced apart by a certain angle to avoid short circuit during electrical connection with the housing.

The materials of the first electrode 11 and the second electrode 12 in the present embodiment are consistent with the electrode materials in the first embodiment, and can be one or more of them. The porous thin film 10 can be prepared by two-step anodization, sintering and other methods, and can be made of biocompatible materials such as aluminum oxide and glass.

A communication unit in the present embodiment includes two through hole sets arranged spaced apart. The two through hole sets are respectively arranged opposite to the first electrical connection unit 111 and the second electrical connection unit 121. Any of the through hole sets includes a first through hole 261 and a second through hole 262. The first through hole 261 is configured to inject conductive slurry into the installation groove 210, and the second through hole 262 is configured to exhaust the installation groove 210, thus ensuring that the conductive slurry can fill up the first electrical connection unit 111 and the second electrical connection unit 121.

The housing 200 in the present embodiment also includes a first housing and a second housing detachably connected to each other, and the first housing and the second housing are arranged symmetrically with respect to an axial direction of the housing 200. The outer wall face of the housing 200 is also provided with a plurality of conductive lead wires, which are electrically connected with the first electrical connection unit 111 and the second electrical connection unit 121 respectively through the cured conductive slurry in the first through holes 261. The material of the housing 200 in the present embodiment is consistent with that in the first embodiment, and the preparation methods of the installation groove 210, the through hole sets and the conductive lead wires are also consistent with those in the first embodiment.

The steps of assembling the thin film electrode with the housing 200 in the present embodiment are basically consistent with those in the first embodiment with the exception that in step 3, the conductive slurry is slowly injected into the two first through holes 261 on the housing 200 by means of glue dispensing, screen printing, perfusion and other technologies respectively in the present embodiment, the conductive slurry is fully contacted with the first electrical connection unit 111 and the second electrical connection unit 121, overflows from the second through holes 262, is connected with the conductive lead wires on the outer wall face of the housing 200, and is heated and cured. A low temperature slurry is preferably selected for the conductive slurry to prevent the high temperature from changing the behavior of the thin film electrode unit 100.

The connected structure in the present embodiment can also be provided with a plurality of installation grooves 210 and corresponding through hole sets on the housing 200, and a plurality of thin film electrode units 100 are arranged in the plurality of installation grooves 210 at the same time.

Third Embodiment

Figure 10:
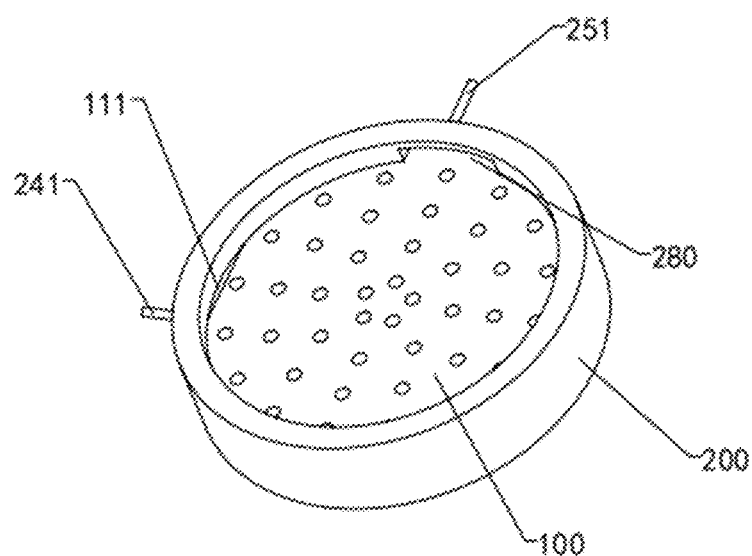
FIG. 10 is a schematic view of the connected structure of the thin film electrode and the housing according to a third embodiment of the present disclosure.
Figure 11:
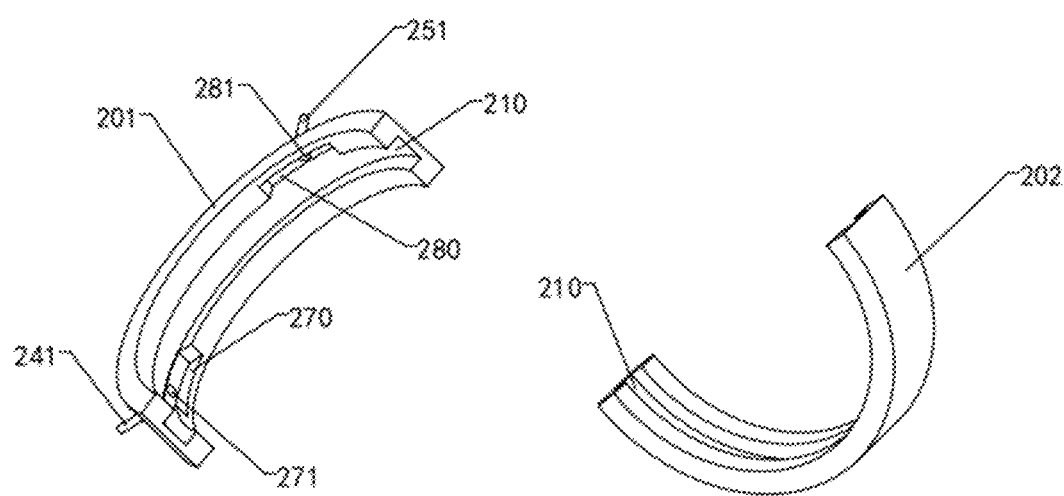
FIG. 11 shows the structural schematic diagrams of the first housing and the second housing disassembled from the housing in FIG. 10.
Figure 12:
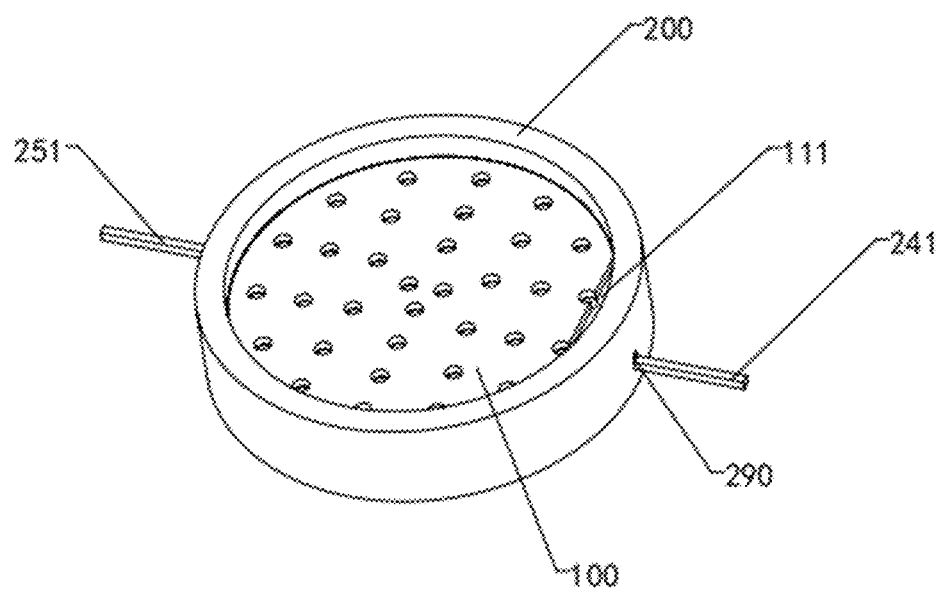
FIG. 12 is a schematic view of the connected structure of the thin film electrode and the housing according to a forth embodiment of the present disclosure.
Figure 13:
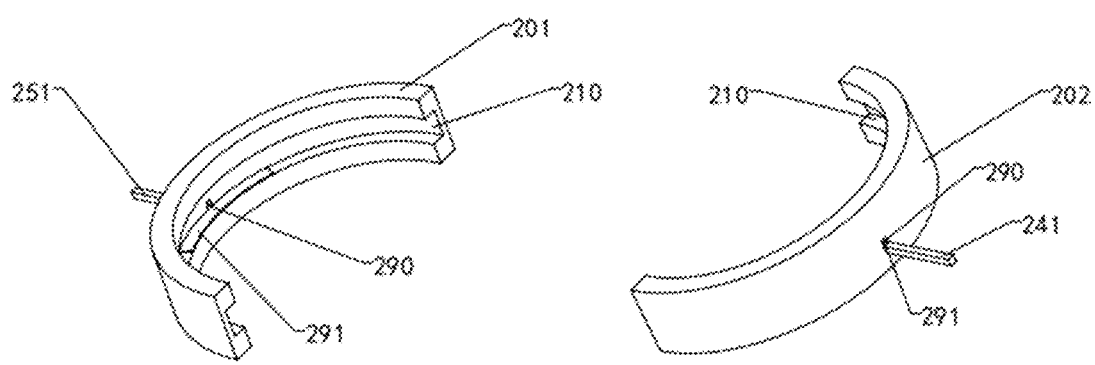
FIG. 13 shows the structural schematic diagrams of the first housing and the second housing disassembled from the housing in FIG. 12.

As shown in FIGS. 10 and 11, the porous thin film 10 in the present embodiment is also a rigid porous thin film. The inner wall face of the housing 200 is further provided with a first loading slot 270 and a second loading slot 280. The first loading slot 270 and the second loading slot 280 are respectively arranged on two sides of the installation groove 210, and are respectively arranged opposite to the first electrical connection unit 111 and the second electrical connection unit 121. The first loading slot 270 is provided with a first exhaust hole 271, and the second loading slot 280 is provided with a second exhaust hole. The exhaust holes and loading slots can be made on the housing 200 by means of machining, injection molding, etching, 3D printing and other methods. In the present embodiment, the housing 200 also includes a first housing and a second housing detachably connected to each other, which are arranged symmetrically with respect to an axial direction of the housing, and the first loading slot 270 and the second loading slot 280 are both arranged on the first housing.

When assembling the thin film electrode of the present embodiment with the housing 200, the following steps are included:

1. fixing part of the thin film electrode unit 100 in the installation groove 210 of the first housing, arranging the first electrical connection unit 111 opposite to the first loading slot 270, and arranging the second electrical connection unit 121 opposite to the second loading slot 280;
2. slowly injecting the conductive slurry into the first loading slot 270 and the second loading slot 280 from the inside of the housing 200 by means of glue dispensing, perfusion and other technologies respectively, so that the conductive slurry fills up parts of the loading slots, fully contacts with the first electrical connection unit 111 and the second electrical connection unit 121, overflows from the first exhaust hole 271 and the second exhaust hole, and is connected with the conductive lead wires on the outer wall face of the housing 200, in which a low temperature slurry is preferably selected for the conductive slurry;
3. heating and curing the conductive slurry;
4. connecting the first housing with the second housing, and installing the other part of the thin film electrode unit 100 in the installation groove 210 of the second housing;
5. welding the first housing and the second housing together by using technologies such as laser welding, thermoacoustic welding, ultrasonic welding, vacuum reflow soldering, and hot pressure welding;
6. selecting biocompatible insulating and water-resistant gel such as silica gel to coat outer layers of the first exhaust hole 271, the second exhaust hole, the conductive slurry and the conductive lead wires.

The connected structure in the present embodiment can also be provided with a plurality of installation grooves 210 and corresponding through hole sets on the housing 200, and a plurality of thin film electrode units 100 are arranged in the plurality of installation grooves 210 at the same time.

Fourth Embodiment

The connected structure in the present embodiment is basically consistent with that in the second embodiment. The difference is that the communication structure in the present embodiment is two installation holes (not shown). The two installation holes are respectively arranged opposite to the first electrical connection unit 111 and the second electrical connection unit 121. Parts of the installation groove 210 that contact with the first electrical connection unit 111 and the second electrical connection unit 121, the first electrical connection unit 111, the second electrical connection unit 121 and the two installation holes are respectively provided with conductive layers. The conductive layer on the inner side of the installation groove 210, the conductive layers inside the installation holes and the conductive lead wires on the outer wall face of the housing 200 are connected in sequence. After the assembly of the thin film electrode unit 100 and the housing 200 is completed, the first electrical connection unit 111 and the second electrical connection unit 121 can be directly electrically connected with the conductive lead wires on the outer wall face of the housing 200 by electroplating a dense conductive metal structure in the two installation holes respectively, without no need to further inject the conductive slurry.

The present application also includes various other embodiments. For example, the thin film electrode unit 100 of the first embodiment is placed in the housing 200 of the second, third or fourth embodiment; or a plurality of installation grooves 210 are respectively arranged on the same housing 200, and the communication units and the thin film electrode units 100 in the first, second, third or fourth embodiment are correspondingly arranged in the plurality of installation grooves 210 respectively, each of which can realize the connection between the thin film electrode and the circuit outside the housing 200.

Described above are only preferred specific embodiments of the present disclosure, but the scope of protection of the present disclosure is not limited to this. Any change or replacement that can be easily conceived by those skilled in the art within the technical scope disclosed by the present disclosure should be covered within the scope of protection of the present disclosure. Therefore, the scope of protection of the present disclosure shall be accorded with the scope of protection of the claims.

The invention claimed is:

1. A connected structure of a thin film electrode and a housing, comprising:
    at least one thin film electrode unit comprising a porous thin film, a first electrode and a second electrode, wherein the first electrode and the second electrode are fitted on two sides of the porous thin film respectively, a part of the porous thin film and a part of the first electrode form a first electrical connection unit, and a part of the porous thin film and a part of the second electrode form a second electrical connection unit;
    a housing, wherein an inner wall face of the housing is provided with at least one installation groove, and the thin film electrode unit is arranged in the installation groove; an outer wall face of the housing is further provided with at least one communication unit for communicating with the installation groove, and the first electrical connection unit and the second electrical connection unit respectively communicate with an external circuit of the housing through the communication unit,
    wherein the communication unit comprises two through hole sets, which are respectively arranged opposite to the first electrical connection unit and the second electrical connection unit; any of the through hole sets comprises a first through hole and a second through hole, the first through hole is configured to inject conductive slurry into the installation groove, and the second through hole is configured to exhaust the installation groove.

2. The connected structure of the thin film electrode and the housing according to claim 1, wherein two sides of the porous thin film are partially provided with the first electrode and the second electrode respectively; the part of the porous thin film that is only provided with the first electrode and a part of the first electrode form the first electrical connection unit, the part of the porous thin film that is only provided with the second electrode and a part of the second electrode form the second electrical connection unit, and the first electrical connection unit and the second electrical connection unit are arranged spaced apart in a circumferential direction of the porous thin film.

3. The connected structure of the thin film electrode and the housing according to claim 1, wherein the porous thin film is a flexible porous thin film, the porous thin film is provided with a first protruding end and a second protruding end, the first protruding end forms the first electrical connection unit with the first electrode which covers the first protruding end, and the second protruding end forms the second electrical connection unit with the second electrode which covers the second protruding end.

4. The connected structure of the thin film electrode and the housing according to claim 1, wherein the communication unit is a first slot and a second slot arranged spaced apart, the first electrical connection unit is arranged opposite to the first slot, and the second electrical connection unit is arranged opposite to the second slot.

5. The connected structure of the thin film electrode and the housing according to claim 4, wherein the outer wall face of the housing is further provided with a first pad and a second pad, the first pad is arranged in correspondence with the first slot, and the second pad is arranged in correspondence with the second slot.

6. The connected structure of the thin film electrode and the housing according to claim 1, wherein the communication unit comprises two installation holes, which are respectively arranged opposite to the first electrical connection unit and the second electrical connection unit; parts of the installation groove which contact with the first electrical connection unit and the second electrical connection unit, the first electrical connection unit, the second electrical connection unit and the two installation holes are respectively provided with conductive layers.

7. The connected structure of the thin film electrode and the housing according to claim 1, wherein the inner wall face of the housing is further provided with a first loading slot and a second loading slot, which are respectively provided on two sides of the installation groove, and which are respectively arranged opposite to the first electrical connection unit and the second electrical connection unit; the first loading slot is provided with a first exhaust hole, and the second loading slot is provided with a second exhaust hole.

8. The connected structure of the thin film electrode and the housing according to claim 1, wherein the housing comprises a first housing and a second housing detachably connected to each other, and the first housing and the second housing are arranged symmetrically with respect to an axial direction of the housing.

9. The connected structure of the thin film electrode and the housing according to claim 1, wherein the outer wall face of the housing is further provided with a plurality of conductive lead wires, a part of the plurality of conductive lead wires conductively communicates with the first electrical connection unit, and the other part of the plurality of conductive lead wires conductively communicates with the second electrical connection unit.

* * * * *